United States Patent
Lee et al.

(10) Patent No.: US 11,248,925 B2
(45) Date of Patent: Feb. 15, 2022

(54) AUGMENTED ROAD LINE DETECTION AND DISPLAY SYSTEM

(71) Applicants: TOYOTA MOTOR ENGINEERING & MANUFACTURING NORTH AMERICA, INC., Erlanger, KY (US); MICHIGAN TECHNOLOGICAL UNIVERSITY, Ann Arbor, MI (US)

(72) Inventors: Jae Seung Lee, Ann Arbor, MI (US); Paul Donald Schmalenberg, Ann Arbor, MI (US); Nikola Stevan Subotic, Ann Arbor, MI (US)

(73) Assignees: TOYOTA MOTOR ENGINEERING & MANUFACTURING NORTH AMERICA, INC., Erlanger, KY (US); MICHIGAN TECHNOLOGICAL UNIVERSITY, Ann Arbor, MI (US)

( * ) Notice: Subject to any disclaimer, the term of this patent is extended or adjusted under 35 U.S.C. 154(b) by 0 days.

(21) Appl. No.: 15/222,424

(22) Filed: Jul. 28, 2016

(65) Prior Publication Data

US 2018/0031384 A1     Feb. 1, 2018

(51) Int. Cl.
| | |
|---|---|
| *G01C 21/36* | (2006.01) |
| *B60R 1/00* | (2006.01) |
| *G06T 19/00* | (2011.01) |
| *G06K 9/00* | (2006.01) |

(52) U.S. Cl.
CPC .............. *G01C 21/365* (2013.01); *B60R 1/00* (2013.01); *G01C 21/3602* (2013.01); *G06K 9/00671* (2013.01); *G06K 9/00791* (2013.01); *G06K 9/00805* (2013.01); *G06T 19/006* (2013.01); *B60R 2300/205* (2013.01); *B60R 2300/305* (2013.01); *B60R 2300/308* (2013.01); *B60R 2300/8086* (2013.01)

(58) Field of Classification Search
CPC ................................ G01C 21/365; B60R 1/00
USPC ......................................................... 345/633
See application file for complete search history.

(56) References Cited

U.S. PATENT DOCUMENTS

| | | | |
|---|---|---|---|
| 7,102,496 B1 * | 9/2006 | Ernst, Jr. .......... | G08G 1/096725 180/167 |
| 8,354,944 B2 | 1/2013 | Riegel et al. | |
| 9,135,754 B2 | 9/2015 | Ng-Thow-Hing et al. | |
| 9,242,647 B2 | 1/2016 | Tsimhoni et al. | |

(Continued)

OTHER PUBLICATIONS

Pratik K. Biswas, Hairong Qi, and Yingyue Xu. 2008. Mobile-agent-based collaborative sensor fusion. Inf. Fusion 9, 3 (Jul. 2008), 399-411.*

*Primary Examiner* — Shivang I Patel
(74) *Attorney, Agent, or Firm* — Oblon, McClelland, Maier & Neustadt, L.L.P.

(57) ABSTRACT

An augmented road line display system that includes one or more sensors installed on a vehicle, one or more external databases, and processing circuitry. The processing circuitry is configured to receive inputs from the one or more databases, sensors of the vehicle, and a sub-system of the vehicle, build and validate a road line model to detect or predict a road line based on the inputs received, determine environmental conditions based on the inputs from one or more of the databases, and a sub-system of the vehicle, assign weights to the inputs received based on the environmental conditions to generate weighted inputs, and execute the road line model to determine the road line based on the weighted inputs.

20 Claims, 5 Drawing Sheets

(56) References Cited

U.S. PATENT DOCUMENTS

| | | | |
|---|---|---|---|
| 2005/0149259 A1* | 7/2005 | Cherveny | G01C 21/26 701/532 |
| 2010/0253489 A1* | 10/2010 | Cui | |
| 2012/0259546 A1 | 10/2012 | Kim | |
| 2013/0120850 A1 | 5/2013 | Lambert et al. | |
| 2015/0100234 A1 | 4/2015 | Schwab et al. | |
| 2015/0112571 A1* | 4/2015 | Schmudderich | B60W 30/08 701/93 |
| 2015/0145996 A1 | 5/2015 | Watanabe et al. | |
| 2015/0213592 A1 | 7/2015 | Mochizuki et al. | |
| 2015/0331422 A1* | 11/2015 | Hartung | G05D 1/021 701/23 |
| 2015/0339811 A1 | 11/2015 | Zhong et al. | |
| 2016/0082840 A1 | 3/2016 | Yoshida et al. | |
| 2016/0090041 A1* | 3/2016 | Nagasawa | B60R 1/00 345/7 |
| 2017/0067750 A1* | 3/2017 | Day | G01C 21/3461 |

\* cited by examiner

AUGMENTED ROAD LINE DETECTION AND DISPLAY SYSTEM

BACKGROUND

Field of the Disclosure

This application relates generally to improvements in a road line detection and display system. More particularly, determining a road line based on information fusion and displaying the road line on a heads-up-display or a windshield of a vehicle.

Description of the Related Art

Conventionally, a road line (or edge) detection system uses a camera and image processing software to identify a road line or other objects in the camera's field-of-view. One or more images from the camera are processed by the image processing software to determine the road line or other objects of interest. One of the popular methods for image processing is based on a mathematical convolution. Typically, an image is treated as a two-dimensional matrix or three-dimensional matrix on which the convolution operation is performed. The convolution of image involves a special matrix multiplication of a kernel matrix and an image matrix. The kernel matrix can cause different effects on the image such as blurring, sharpening, reconstructing the outline or edge of images, warping, cropping, etc. One or more outputs obtained from convolution of the images can be used to identify objects or anomalies in an image.

Anomalies detection allows the road line detection system to alert the drivers of upcoming obstacles such as road work, people crossing, a rock, missing road lines, etc. The road line can be displayed on a screen to be viewed by a driver as a guide to stay in a lane.

SUMMARY

According to an embodiment of the present disclosure, there is provided an augmented road line system. The augmented road line display system includes one or more sensors installed on a vehicle, one or more databases, and processing circuitry. The processing circuitry is configured to receive inputs from the one or more databases, sensors of the vehicle, and a sub-system of the vehicle, build and validate a road line model to detect or predict a road line based on the inputs received, determine environmental conditions based on the inputs from the one or more databases, and a sub-system of the vehicle, assign weights to the inputs received based on the environmental conditions to generate weighted inputs, and execute the road line model to determine the road line based on the weighted inputs.

The processing circuitry is further configured to detect one or more objects along a road in a driving direction, construct an augmented road line by augmenting the road line with the one or more objects detected on the road, and display the augmented road line on a heads-up display or on a windshield located in front of a driver of the vehicle.

Further, according to an embodiment of the present disclosure, there is provided a method for determining an augmented road line display. The method includes receiving, using processing circuitry, inputs from the one or more database, sensors of the vehicle, and a sub-system of the vehicle, building and validating, using the processing circuitry, a road line model to detect or predict a road line based on the inputs received, determining, using the processing circuitry, environmental conditions based on the inputs from one or more of the databases, and a sub-system of the vehicle, assigning, using the processing circuitry, weights to the inputs received based on the environmental conditions to generate weighted inputs, and executing, using the processing circuitry, the road line model to determine the road line based on the weighted inputs.

The method further includes detecting, using the processing circuitry, one or more objects along a road in a driving direction, constructing, using the processing circuitry, an augmented road line by augmenting the road line with the one or more objects detected on the road, and displaying, using the processing circuitry, the augmented road line on a heads-up display or on a windshield located in front of a driver of the vehicle.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiment(s) may be practiced without those specific details. In some instances, well-known structures and components may be shown in block diagram form in order to avoid obscuring the concepts of the disclosed subject matter.

Furthermore, the terms "approximately," "substantially," and similar terms generally refer to ranges that include the identified value within a margin of 20%, 10% or preferably 5% in certain embodiments, and any values therebetween.

The present disclosure is related to a highly automated vehicle, where involves a cooperation between a driver, a vehicle and an infrastructure. The infrastructure provides information about roads and a vehicle location, the vehicle processes a variety of information from different sources and presents helpful guidelines to the driver while driving. For example, an accurate road line (or edge) is constructed using multitude of data resources and an image is displayed on the windshield in real-time so that driver can follow the road lines displayed in the image.

A typical global positioning system (GPS) resolution can be anywhere from 1 meters to 10 meters, as such GPS information alone may not good enough to identify accurate edge of a road. An information fusion controller that combines a multitude of information to determine road lines can provide higher accuracy and robustness as it receives several inputs, each input having individual strengths and availability.

Figure 1:
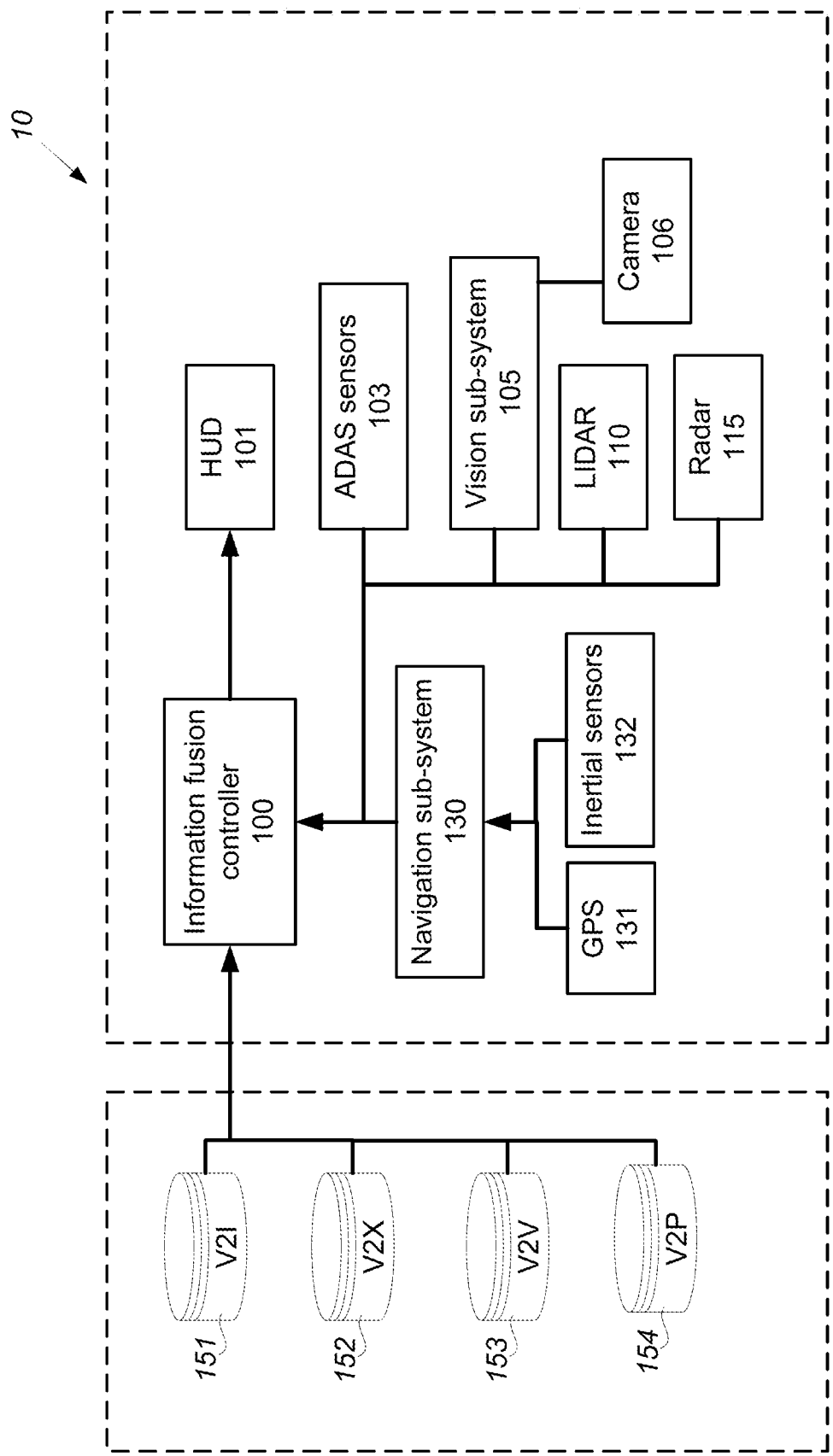
FIG. 1 is a block diagram of an augmented road line display system according to an exemplary embodiment of the present disclosure.

FIG. 1 is a block diagram of an augmented road line display system according to an embodiment of the present disclosure. The augmented road line display system 10 (referred to as system 10 hereinafter) includes an information fusion controller 100 and a heads-up display 101 (referred as HUD 101 hereinafter). The information fusion controller 100 is configured to receive information from different sources, integrate the information to detect or determine road lines, identify objects in a path along a driving direction, augment the road lines with the objects, and display the augmented road line information on the heads-up display 101, on a windshield of the vehicle, or other appropriate displays. The road lines can be virtual lane makers, an edge of the road, or a virtual lane in which the vehicle is desired to stay.

The information fusion controller 100 is configured to receive information from different sensors and sub-systems installed on the vehicle, as well as from external databases. For example, the information fusion controller 100 receives information from a vision sub-system 105 having a camera 106, sensors such as a lidar 110, a radar 115, and sensors related to an advanced drive assistant sub-system 103 (referred to as ADAS sensors 103 hereinafter). The information fusion controller 100 can also receive information from a navigation sub-system 130, which includes a global positioning system 131 (referred to as GPS 131 hereinafter) and inertial sensors 132 that can calculate the position, velocity and orientation of the vehicle without the need of an external reference.

Furthermore, the information fusion controller 100 can be configured to receive information from external databases or servers including, but not limited to, an infrastructure database 151 (referred as V2I 151 hereinafter), a traffic update server 152 (referred as V2X 152 hereinafter), a connected vehicle database 153 (referred as V2V 153 hereinafter), and a public real time kinetic database 154 (referred as V2P 154 hereinafter). A detailed process implemented by the information fusion controller 100 is discussed with respect to FIGS. 2 and 3.

The ADAS sensors 103 can include one or more sensors to determine and provide driving assistance such as cruise control, antilock braking, etc. to the driver. The ADAS sensors 130 can include, tire pressure sensors, speed and acceleration sensors, steering sensors, brake sensors, lidar 110, radar 115, etc. Optionally, the vehicle can include sensors such as engine temperature sensors, brake pad status sensors, tire tread sensors, fuel sensors, oil level and quality sensors, air quality sensors (for detecting temperature, humidity, or particulates in the air), precipitation sensors for automatic windshield wipers, etc. The aforementioned sensors can be used by the ADAS or other sub-systems of the vehicle, for example, to determine the weather or a vehicle condition.

The ADAS can provide information such as speed, distance to other vehicles, rainy condition, etc. to the information fusion controller 100 that can be used to detect or identify road lines. For instance, the lidar 110 and radar 115 can provide distance related information and road condition, which can be useful to determine the road lines. The radar 115 can generate reflection patterns which can enable identification of road lines painted on the road, ditches or cracks in the road, etc. The radar 115 information can be particularly useful in low visibility conditions, dark environment, etc.

The lidar 110 can be a chip scale lidar. The chip scale lidar is a high-speed, and low-power optical phased array. The array is based on a phase shifting architecture. The approach utilizes approximately 32 μm long grating based antennas, fed through evanescent field waveguide couplers from a bus waveguide with directly integrated thermo-optic phase shifters. Several such lidars can work together without interfering, an important feature for accident avoidance applications. The lidar 110 can also be used to detect objects within its field-of-view, distance to other objects such as neighboring vehicles, walls, railings, etc.

The vision sub-system 105 can also be used to monitor driver behavior in the vehicle, road conditions, visibility, objects along the driving path, etc. The objects can be stationary such as road signs, trees, railings, etc. or the objects can be moving such as people crossing the road, construction workers, other vehicles, etc. The camera 106 can capture the images or video inside or outside the vehicle and send the images to the vision sub-system 105 for processing. The vision sub-system 105 can be programmed to extract information including objects, visibility, road condition, etc. from the images and transmit the vision information to the information fusion controller 100 for further processing. Depending on the visibility and clarity of images, the vision information may or may not be trusted. As such, the information fusion controller 100 will compare the vision information with the information from other sources to assign a confidence level. For example, in bright and sunny weather conditions, the images and videos can be clear and may be in agreement with information from other sources (e.g., lidar 110, radar 115 or external databases). As such, the vision information can be assigned a relatively higher confidence level compared to the vision information obtained in snowy or foggy conditions, as the images may be distorted or unclear.

The navigation sub-system 130 in the vehicle that provides directions from a starting location to a destination can include a geographic position component such as a GPS 131 and inertial sensors 132. The GPS 131 can determine the vehicle's latitude, longitude and/or altitude position, and the inertial sensors 132 such as an accelerometer, a gyroscope or another direction/speed detection device to determine a direction and speed of the vehicle or changes thereto. In addition, maps can be stored in a memory of the navigation sub-system 130. A map can include information related to lane markings, speed limits, etc. The navigation sub-system 130 can send the navigation information including GPS coordinates, speed, direction, lane markings, etc. along a route to the information fusion controller 100. The information fusion controller 100 can then integrate and/or compare the navigation information from the navigation sub-system 130 and the vision information from the vision sub-system 105 to determine the road lines.

The information fusion controller 100 can also receive information from external servers or databases such as the V2I 151, V2X 152, V2V 153, and V2P 154. The V2I 151 can provide infrastructure information. For example, the infrastructure information can include road signs, road conditions affected due to weather or an accident, construction, length and width of the road, curvature, banking, slope, etc. The infrastructure information can be integrated by the information fusion controller 100 to determine road lines or objects along the road. For example, a road width, curvature, and/or slope can be useful in determining the width of a road line, the curvature of the road line, and a total number of lanes. The infrastructure information can be advantageous in several situations such as when driving through a tunnel, where a GPS signal can be weak, or a camera image can be unclear. Further, in circumstances where the infrastructure changes and new lanes are built or old lanes are shifted availability of updated infrastructure information can enable the information fusion controller 100 to accurately determine the road lines.

The V2X 152 can provide real-time traffic information. The traffic information can be integrated by the information fusion controller 100 to identify potential objects (e.g., a disabled car, accident, etc.) along the path that may create bottle neck issues and cause the traffic to be redirected. Based on the traffic information, the information fusion controller 100 can modify the lane markings constructed using the vision information, the navigation information and/or the other information sources discussed in the present disclosure. Thus, the road lines can be modified in real-time based on changing traffic patterns.

The V2V 153 can provide localization information related to connected vehicles that can communicate with other vehicles such as autonomous vehicles equipped with direct short distance communication modules. As the vehicle can communicate with other neighboring vehicles along the road, the V2V 153 can provide localization information such as an absolute location of neighboring vehicles. The localization information can help determine road lanes or objects with an accuracy level up to 1 meter. Alternatively or in addition, the localization information such as the vehicle information, speed, and distance can be augmented with the road lines.

The V2P 154 can provide real time kinetic (RTK) information that provides highly precise positional data via satellite navigation systems. Using the RTK information the information fusion controller 100 can achieve a resolution up to a few centimeters. Thus, highly accurate road lines can be constructed by integrating the RTK information with information from other sources such as the vision information, the navigation information, etc.

Figure 2:
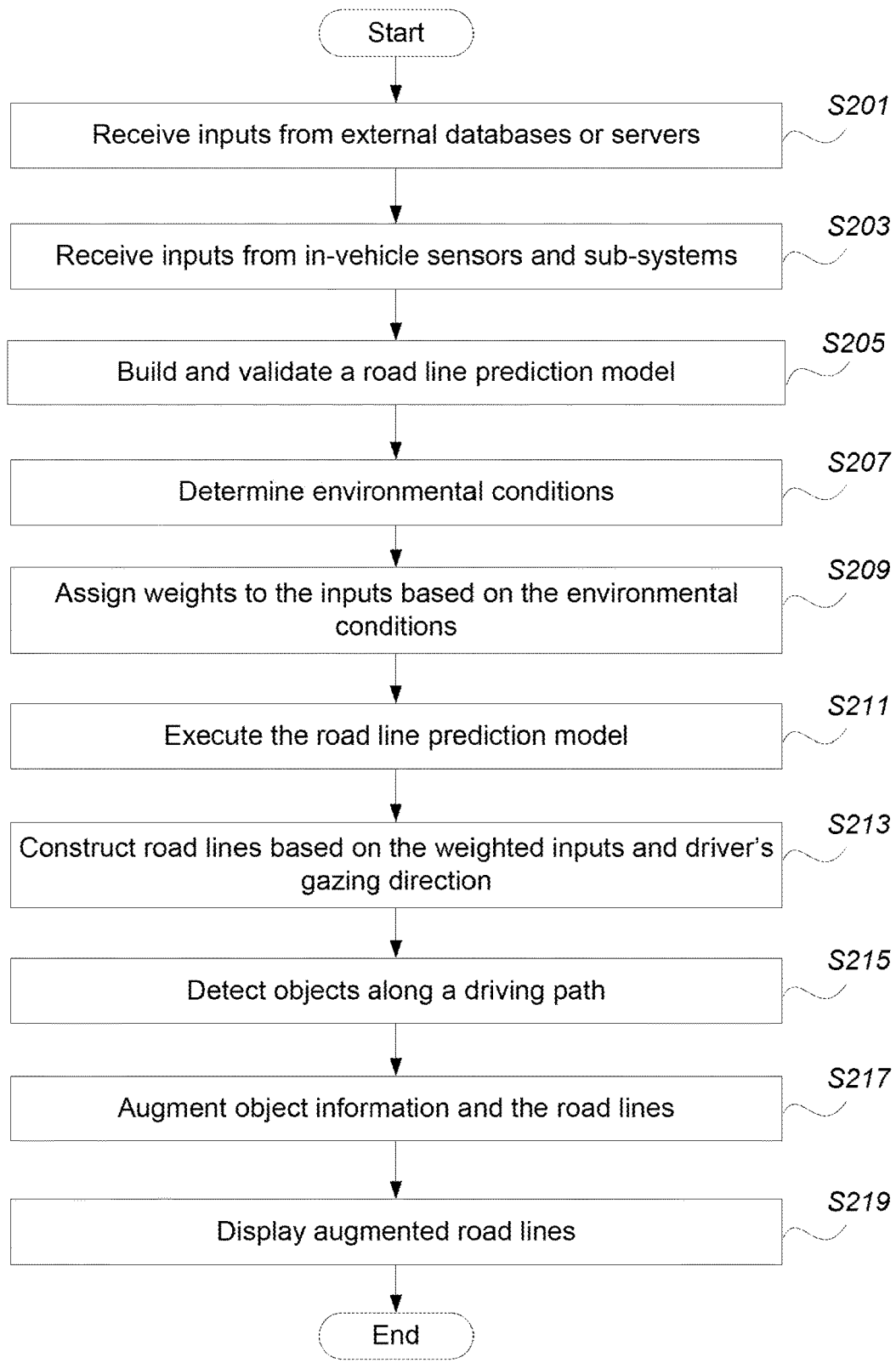
FIG. 2 illustrates a flow chart for a road line determination and display process implemented by the information fusion controller according to an exemplary embodiment of the present disclosure.

FIG. 2 illustrates a flow chart of the road line determination and display process implemented by the information fusion controller 100 according to an exemplary embodiment of the present disclosure. The process starts when requested by the driver, or automatically when visibility is low.

In step S201, the information fusion controller 100 receives inputs from external databases or servers. For example, inputs from the V2I 151, V2X 152, V2V 153, and V2P 154 as discussed with respect to FIG. 1. Similarly, in step S203, the information fusion controller 100 receives inputs from in-vehicle sensors and sub-systems. For example, inputs from the ADAS sensors 103, the lidar 110, the radar 115, the vision sub-system 105, etc.

In step S205, the information fusion controller 100 builds a road line prediction model based on the inputs received and then validates the road line prediction model based on data collected over a period of time during the trips to different locations, in different weather conditions, along different road profiles, etc. The validation step ensures that the road prediction model predicts the road lines with a high confidence level (e.g., more than 80% confidence).

The road prediction model can be a statistical model such as a linear regression model, or a Bayesian model that includes categorical variables for weather conditions, and confidence level in the inputs. Further, each input received is associated with an input variable and a weight indicating how important the input variable is compared to other input variables. For example, an input variable can be a distance captured by the lidar 110, a speed captured by the inertial sensors 132, a distance-between vehicle captured by one or the ADAS sensors 103, a traffic condition and an average speed in traffic captured by the V2X 152, an absolute location of a neighboring vehicle captured by the V2V 153, etc. The road prediction model can be one model or a combination of statistical models. The output of the road prediction model is an estimated road line or a true road line that is marked on a road within which the vehicle should be driven.

The step S205 can be performed separately and independently as a distinct process before executing the remaining steps illustrated in FIG. 2. If step S205 is performed as a separate process, then the step S205 can be omitted.

In step S207, the information fusion controller 100 determines environmental conditions based on the inputs from the external database and/or the in-vehicle sensors. The environmental conditions are one of a plurality of factors based upon which the road line is determined. Depending on the environmental conditions, certain input variables of the road line prediction model may be unavailable, or may not be trusted. As such, the road line prediction can vary depending on the weather conditions. Further, based on the environmental conditions, weights can be assigned to the input variables, giving a higher importance to the input variables that can be trusted over the input variables that may not be trusted. In step S209, the information fusion controller 100 assigns weights to the inputs based on the environmental conditions. The process of assigning weights is discussed in more detail with respect to FIG. 3.

In step S211, the information fusion controller 100 executes the road line prediction model using the inputs received in steps S201 and S203. The road line prediction model outputs a position of the road line. The position can be in co-ordinates with respect to the vehicle or the edge of the road. It can be understood by a person skilled in art that the inputs are received continuously during the entire process and current as well as past data is available as needed.

In step S213, the information fusion controller 100 constructs, for display purposes, the road lines obtained from the road prediction model based on the weighted inputs and a driver's gazing direction that can be determined using the camera 106.

Further, in step S215, the information fusion controller 100 can detect objects along a driving path. The objects can be identified using different sources of information such as the vision sub-system 105, the lidar 110 and/or the radar 115, and inputs from V2V 153. The information fusion controller 100 can implement an object detection or anomaly detection algorithm to identify the objects from aforementioned sources of information. For example, using the vision subsystem 105 objects such as road signs, people along the road, neighboring vehicles (i.e., vehicles on the side or in front), etc. can be identified. Furthermore, additional information such as the distance to the object, the speed of the object, or other relevant information related to the object can also be determined.

Figure 4:
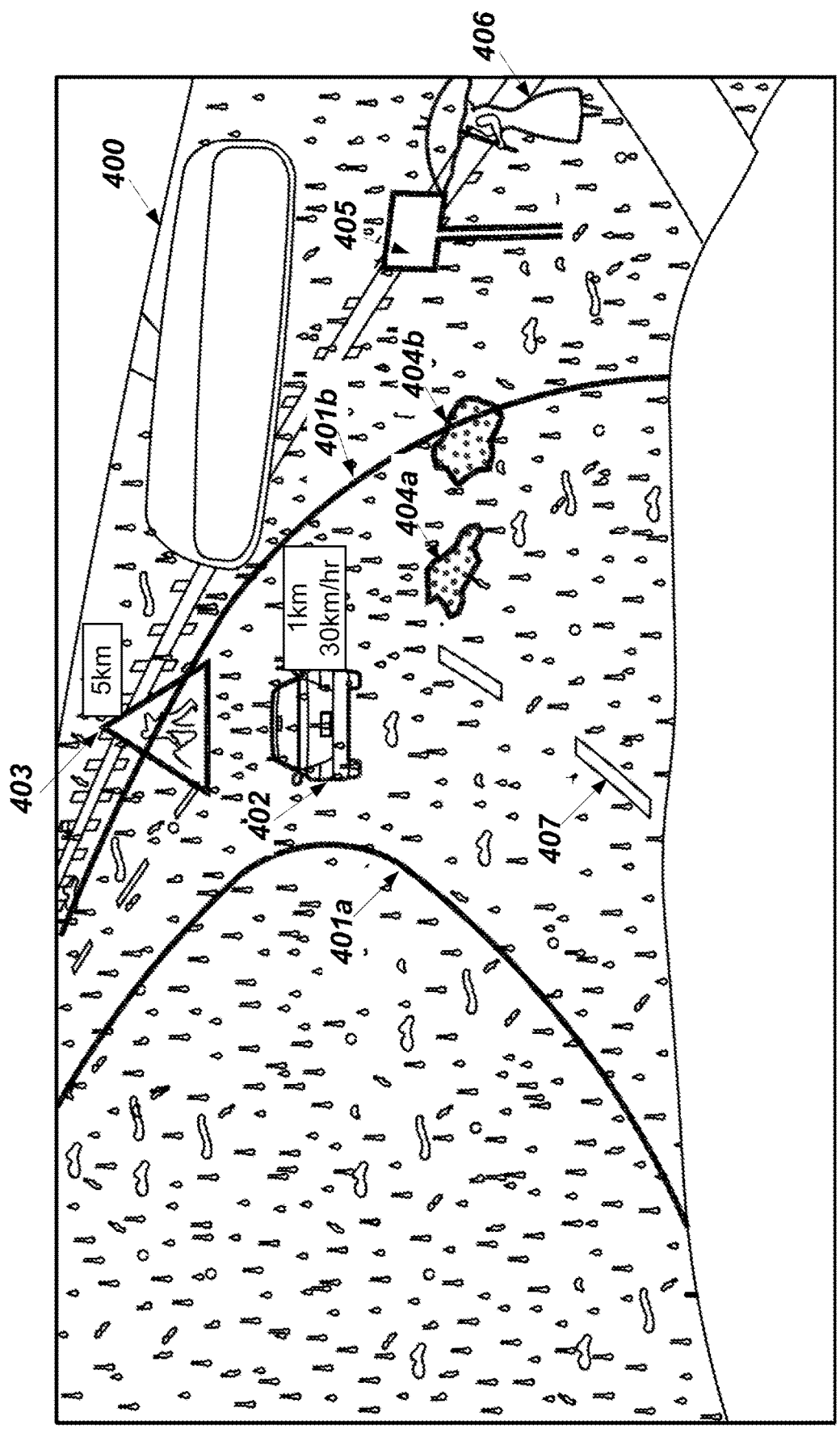
FIG. 4 shows an exemplary augmented road line displayed on a windshield according to an exemplary embodiment of the present disclosure.

In step S217, the information fusion controller 100 augments the road lines constructed in S213 with the object information determined in the step S215 to generate an imagery of augmented road lines. The augmented road lines are then displayed on a display of an external device, in step S219. For example, the augmented lines can be displayed on a HUD 101, the windshield of the vehicle, a smart phone, a laptop or a tablet of a navigator guiding the driver of the vehicle, etc. An exemplary image of the augmented road line is shown in FIG. 4.

Figure 3:
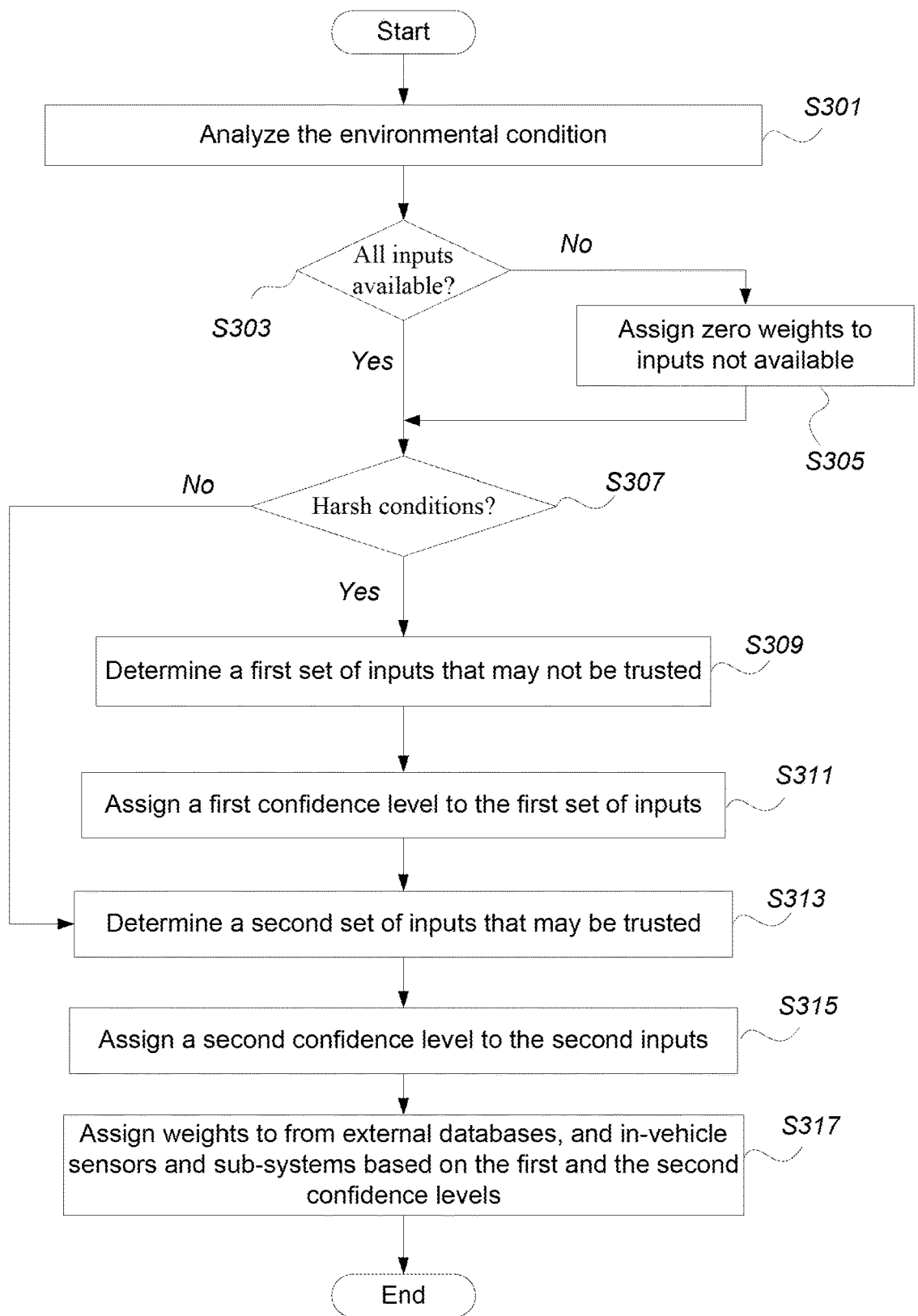
FIG. 3 is a flow chart for assigning weights to inputs according to an exemplary embodiment of the present disclosure.

FIG. 3 is a flow chart for assigning weights to inputs according to an exemplary embodiment of the present disclosure. The process of assigning weights starts in step S209 of FIG. 2 after determining the environmental conditions. Referring to FIG. 3, the information fusion controller 100 analyzes the environmental conditions, in step S301. The environmental conditions can be weather related, road conditions, or traffic related. For example, the weather conditions can be sunny, rainy, snowy, foggy, etc. The road condition can be rough, smooth, reflect potholes, patches, etc. Further, analyzing the environmental conditions can include determining whether the vehicle is driving through a tunnel, a forest, mountainous region, etc.

In step S303, the information fusion controller 100 determines whether all inputs from different sources are available. If some of the inputs are not available, for example, due to faulty or damaged sensors, the information fusion controller 100 assigns a zero weight to the corresponding inputs, in step S305. As such, unavailable inputs will be automatically ignored during the road line determination.

In step S307, the information fusion controller 100 determines whether the environmental condition is a harsh condition. A harsh condition can include conditions with low visibility, for example conditions encountered when driving through a tunnel or a forest, rough roads, roads with potholes or excessive construction work in progress, etc. When a harsh condition is detected, the information fusion controller 100 determines a first set of inputs that may not be trusted due to the harsh conditions, in step S309. For example, the vision information from the vision sub-system 105 may not be trusted in dark or heavy snow conditions, or the navigation information (e.g., GPS coordinates) may not be trusted in a tunnel, etc.

In step S311, the information fusion controller 100 assigns a first confidence level to the first set of inputs. A confidence level can be a numerical value on a scale from 1 to 10, where 1 indicates a lowest confidence level while 10 indicates the highest. The first confidence level can be a value limited to the range from 1 to 5.

Further, in step S313, the information fusion controller 100 determines a second set of inputs that may be trusted. For example, in heavy snow conditions the navigation information, radar 115 information, the traffic information, the infrastructure information and connected vehicle information can be trusted; and in a tunnel or a forest—the lidar 110 and radar 115 information can be trusted, etc. In step S315, the information fusion controller 100 assigns a second confidence level to the second inputs. The second confidence level can be a numeral value limited to the range 6 to 10.

In step S317, the information fusion controller 100 assigns weights to the inputs from external databases, and in-vehicle sensors and sub-systems based on the first and the second confidence levels. An input with low confidence level can be assigned a lower weight compared to an input with a high confidence level. In one embodiment, each input may be assigned an initial weight computed by dividing the total number of inputs by 100 and then scaling the initial weight by the confidence level. For example, if there are 10 inputs, an initial weight of each input will be 0.1. Further, if the confidence level of each input is the same (e.g., 5), then the weight of each input will be 0.1*5 (i.e., weight of each input will be 0.5). In another example, if a first input has a confidence level of 1, and a second input has a confidence level of 9, then the first input will be assigned a weight of 0.1 and the second input will be assigned a weight of 0.9. Assigning weights to the inputs based on confidence level in turn results in an accurate estimation of the road lines.

FIG. 4 shows an exemplary augmented road line displayed on a windshield according to an exemplary embodiment of the present disclosure. The augmented road line can include road lines 401a and 401b augmented with different objects and related information that can be displayed on a windshield 400, the HUD 101 (not shown in FIG. 4), or other displays readily accessible to a driver. Optionally, the road lines 401a and 401b can be augmented with a center line 407 to assist the driver in identifying the center of a lane. The road line 401b conforms to a road edge or a railing on the side of the road thus guiding the driver to stay away from the curb. Further, the road line 401a is constructed substantially parallel to the road line 401b to create a virtual lane marking within which the vehicle should be maintained. The road lines 401a and 401b can be displayed in a colored form such as green, and the center line can also be colored such as yellow.

The objects displayed along with the road lines 401a and 401b can include a neighboring vehicle 402, which can be associated with information such as distance (e.g., 1 km away) and a travelling speed (e.g., 30 km/hr). The objects displayed can also include construction work 403 located, for example, 5 km away, potholes 404a and 404b, a road sign 405, a person 406 standing at the edge of the road. The objects can be highlighted in different colors to uniquely identify an object. For example, red can be used to assist a driver to readily identify objects that the driver should possibly look out for, thus creating a safer driving experience. Alternatively or in addition, the color of the objects can be changed based on the proximity of the vehicle approaching the objects. For example, the objects can be marked in white when the objects are far (more than 5 kms). The color of the objects can be switched to yellow, as the vehicle approaches the objects and the distance between the objects and the vehicle reduces (e.g., between 1 to 2 kms). Further, the color of the objects can be switched to red, when the vehicle is too close to the objects (e.g., less than 20 m). Thus, providing a visual feedback and alerting the driver to take appropriate actions.

Figure 5:
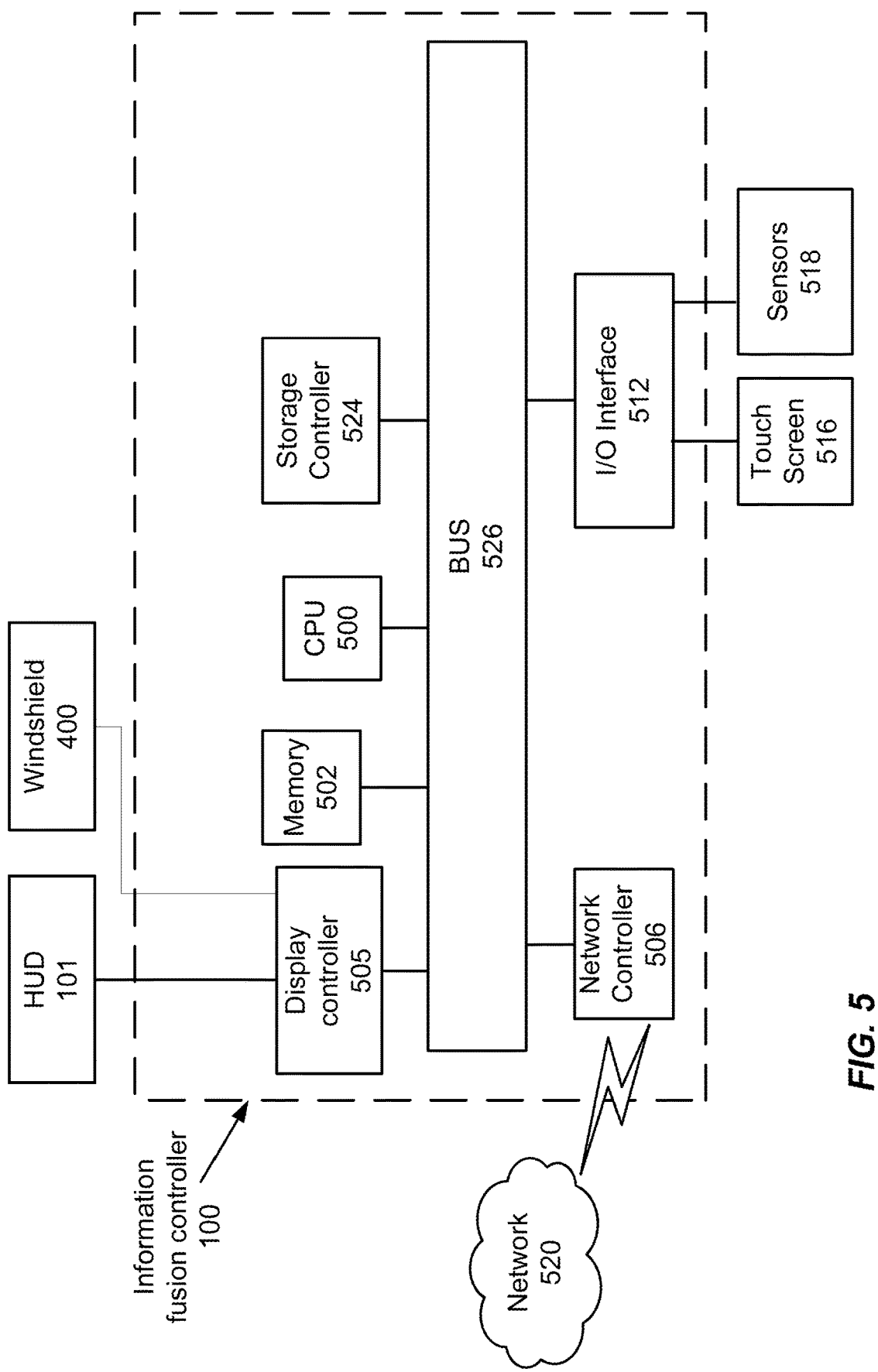
FIG. 5 is a detailed block diagram illustrating an exemplary information fusion controller according to an exemplary embodiment of the present disclosure.

FIG. 5 is a detailed block diagram illustrating an exemplary information fusion controller 100 according to an embodiment of the present disclosure. In FIG. 5, the information fusion controller 100 includes a CPU 500 having an operating system which can be configured to perform the processes described in the present disclosure with respect to FIGS. 2 and 3. The process data and instructions may be stored in a memory 502 or a storage medium such as a hard drive (HDD), flash memory, or a solid state drive.

The hardware elements, in order to achieve the information fusion controller 100, may be realized by various circuitry elements, known to those skilled in the art. For example, CPU 500 may be a XENON or Core processor from INTEL of America or an Opteron processor from AMD of America, or may be other processor types that would be recognized by one of ordinary skill in the art. Alternatively, the CPU 500 may be implemented on an FPGA, ASIC, PLD or using discrete logic circuits, as one of ordinary skill in the art would recognize. Further, CPU 500 may be implemented as multiple processors cooperatively working in parallel to perform the instructions of the inventive processes described above with respect to FIGS. 2 and 3.

The information fusion controller 100, in FIG. 5, also includes a network controller 506 for interfacing with a network 520. The network 520 can also be wired, such as an Ethernet network, or can be wireless such as a cellular network including EDGE, 3G and 4G wireless cellular systems. The wireless network can also be WiFi, BLUETOOTH, or any other wireless form of communication that is known. The information fusion controller 100, via the network controller 506 can communicate the external databases or servers such as V2I 151, V2X 152, V2V 153, and V2P 154. Furthermore, the information fusion controller 100, via the network controller 506 can communicate with the lidar 110, the radar 115, or other sensors with wireless communication capabilities.

An I/O interface 512 interfaces with a touch screen panel 516 on or separate from a display of the HUD 101. The I/O interface can also connect to a variety sensors 518 such as the ADAS sensors 103, lidar 110, radar 115, etc.

A display controller 505 can control the display of the images obtained from CPU 500 after performing the process discussed in FIGS. 2, 3 and 4. For example, the display controller 505 can communicate with the display of the HUD 101 or a projector to display images, as discussed with respect to FIG. 4, on the windshield 400.

The storage controller 524 connects memory 502 with communication bus 526 for interconnecting all of the components of the information fusion controller 100. A description of the general features and functionality of several storage medium, the display controller 505, the storage controller 524, network controller 506, the I/O interface 512 etc. is well known and omitted herein for brevity as these features are known.

In the above description, any processes, descriptions or blocks in flowcharts should be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures. For example, this technology may be structured for cloud computing whereby a single function is shared and processed in collaboration among a plurality of apparatuses via a network.

What is claimed is:

1. An augmented road line display system, comprising:
one or more sensors installed on a vehicle;
one or more databases external to the vehicle; and
processing circuitry configured to
receive inputs from the one or more databases, one or more sensors of the vehicle, and a sub-system of the vehicle, the vehicle sub-system includes an inertial location sub-system,
build and validate a road line model to detect or predict a road line based on the inputs received,
determine environmental conditions based on the inputs from the one or more databases, the one or more sensors of the vehicle, and the sub-system of the vehicle,
assign a first set of confidence levels to a first set of inputs which cannot be trusted due to the determined environmental conditions based upon a comparison between at least an input from the one or more databases and an input from at least one of the one or more sensors and the sub-system of the vehicle, the first set of confidence levels chosen from a first range of available confidence levels,
assign a second set of confidence levels to a second set of inputs which can be trusted due to the determined environmental conditions based upon the comparison, the second set of confidence levels chosen from a second range of the available confidence levels different from the first range,
assign weights to the inputs based on the first and second set of confidence levels to generate weighted inputs,
execute the road line model to determine the road line based on the weighted inputs, and
display an augmented road line on a heads-up display, the augmented road line being displayed as a dashed line and indicating a center of a lane, the augmented road line including an indication of a distance from the vehicle to one or more objects identified by the augmented road line display system and a speed of the one or more objects, the indication being displayed next to the one or more objects, the one or more object being highlighted in different colors on the heads-up display.

2. The system according to claim 1, wherein the processing circuitry is further configured to:
detect the one or more objects on or along a road in a driving direction,
construct an augmented road line by augmenting the road line with the one or more objects detected on the road.

3. The system according to claim 1, wherein the one or more databases includes at least one of:
an infrastructure database,
a traffic update server,
a connected vehicle database, and
a public real time kinetic database.

4. The system according to claim 3, wherein the sub-system of the vehicle includes at least one of:
a vision sub-system,
a vehicle-to-vehicle communication subsystem, and
a navigation sub-system.

5. The system according to claim 4, wherein the comparison includes a comparison between the input from the one or more databases and an input from one of the sub-systems of the vehicle.

6. The system according to claim 4, wherein the vision sub-system includes at least one of a camera, a lidar, and a radar.

7. The system according to claim 6, wherein the comparison includes a comparison between an input from one of the camera, the lidar, and the radar and the input from the one or more databases.

8. The system according to claim 1, wherein the one or more sensors of the vehicle includes at least one of a lidar and a radar.

9. The system according to claim 1, wherein the road line model is a statistical model based on parameters computed using the inputs received from the one or more databases, the one or more sensors of the vehicle, and the sub-system of the vehicle.

10. The system according to claim 1, wherein a higher weight is assigned an input received from the one or more sensors of the vehicle compared to an input received from the one or more databases when access to the one or more databases is unavailable.

11. The system according to claim 1, wherein the sub-system of the vehicle includes a vehicle-to-vehicle communication subsystem.

12. The system according to claim 1, wherein the one or more sensors of the vehicle includes a plurality of chip scale lidars.

13. The system according to claim 12, wherein each of the plurality of chip scale lidars includes a grating based antenna having a length in the tens of micrometers.

14. A method for an augmented road line display, the method comprising:
  receiving, using processing circuitry, inputs from one or more databases external to a vehicle, one or more sensors of the vehicle, and a sub-system of the vehicle;
  building and validating, using the processing circuitry, a road line model to detect or predict a road line based on the inputs received;
  determining, using the processing circuitry, environmental conditions based on the inputs from the one or more databases, the one or more sensors of the vehicle, and the sub-system of the vehicle the vehicle sub-system includes an inertial location sub-system;
  assigning, using the processing circuitry, a first set of confidence levels to a first set of inputs which cannot be trusted due to the determined environmental conditions based upon a comparison between at least an input from the one or more databases and an input from at least one of the one or more sensors and the sub-system of the vehicle, the first set of confidence levels chosen from a first range of available confidence levels,
  assigning, using the processing circuitry, a second set of confidence levels to a second set of inputs which can be trusted due to the determined environmental conditions based upon the comparison, the second set of confidence levels chosen from a second range of the available confidence levels different from the first range,
  assigning, using the processing circuitry, weights to the inputs received based on the first and second set of confidence levels to generate weighted inputs;
  executing, using the processing circuitry, the road line model to determine the road line based on the weighted inputs; and
  displaying an augmented road line on a heads-up display, the augmented road line being displayed as a dashed line and indicating a center of a lane, the augmented road line including an indication of a distance from the vehicle to one or more objects identified by the one or more sensors and a speed of the one or more objects, the indication being displayed next to the one or more objects, the one or more object being highlighted in different colors on the heads-up display.

15. The method according to claim 14, further comprising:
  detecting, using the processing circuitry, the one or more objects along a road in a driving direction;
  constructing, using the processing circuitry, an augmented road line by augmenting the road line with the one or more objects detected on the road.

16. The method according to claim 14, wherein the one or more databases includes at least one of:
  an infrastructure database,
  a traffic update server,
  a connected vehicle database, and
  a public real time kinetic database.

17. The method according to claim 16, wherein the sub-system of the vehicle includes at least one of:
  a vision sub-system,
  a vehicle-to-vehicle communication subsystem, and
  a navigation sub-system.

18. The method according to claim 14, wherein the one or more sensors of the vehicle includes at least one of a lidar and a radar.

19. The method according to claim 14, wherein a road line model is a statistical model based on parameters computed using the inputs received from the one or more databases, one or more sensors of a vehicle, and the sub-system of the vehicle.

20. The method according to claim 14, wherein a higher weight is assigned to an input received from the one or more sensors of the vehicle compared to an input received from the one or more databases when access to the one or more databases is unavailable.

* * * * *